F. W. DEGEN.
Sulky-Cultivator.

No. 207,398. Patented Aug. 27, 1878.

Fig: 1.

WITNESSES:
Chas. Nida
C. Sedgwick

INVENTOR:
F. W. Degen
BY Munn & Co
ATTORNEYS.

2 Sheets—Sheet 2.

F. W. DEGEN.
Sulky-Cultivator.

No. 207,398. Patented Aug. 27, 1878.

WITNESSES:

INVENTOR:
F. W. Degen
BY
ATTORNEYS.

UNITED STATES PATENT OFFICE.

FREDRIC W. DEGEN, OF NEW ATHENS, ILLINOIS.

IMPROVEMENT IN SULKY-CULTIVATORS.

Specification forming part of Letters Patent No. 207,398, dated August 27, 1878; application filed February 1, 1878.

*To all whom it may concern:*

Figure 1:
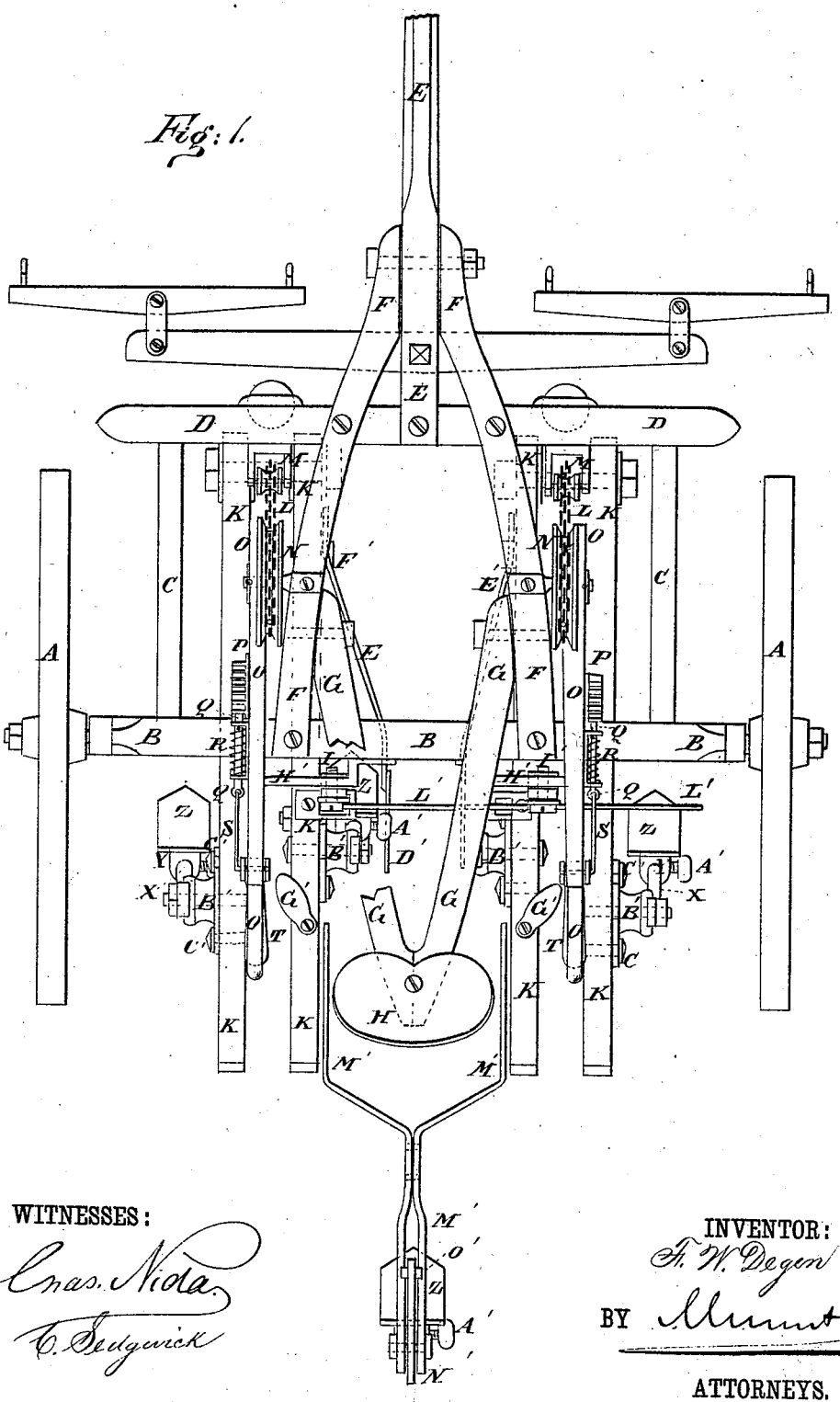
Figure 2:
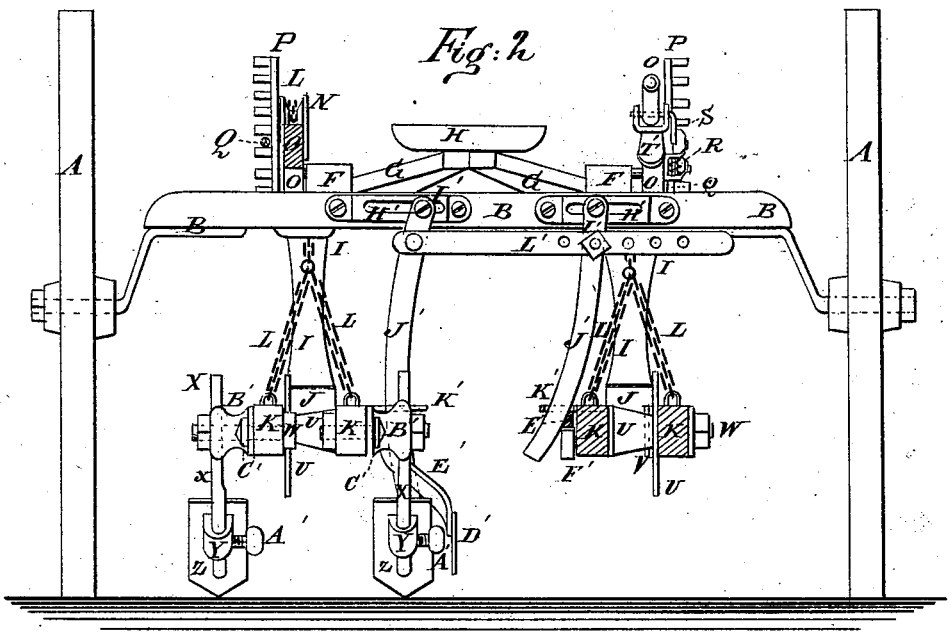
Figure 3:
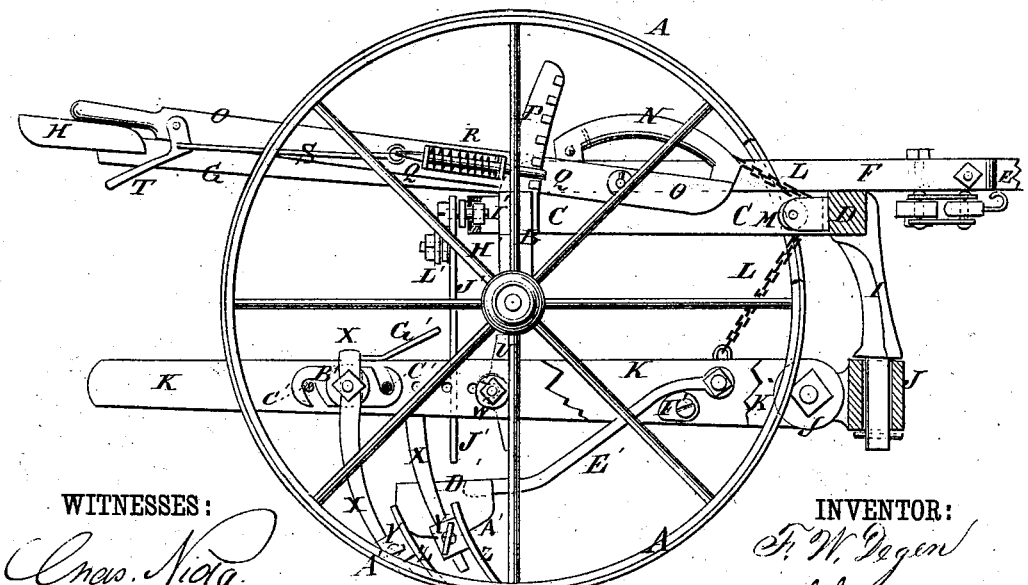

Be it known that I, FREDRIC WILLIAM DEGEN, of New Athens, in the county of St. Clair and State of Illinois, have invented a new and useful Improvement in Sulky-Cultivators, of which the following is a specification:

Figure 1, Sheet 1, is a top view of my improved cultivator, part being broken away and showing the fifth plow detached. Fig. 2, Sheet 2, is a rear view of the same, partly in section to show the construction. Fig. 3, Sheet 2, is a side view of the same, parts being broken away to show the construction.

Similar letters of reference indicate corresponding parts.

The object of this invention is to furnish an improved sulky-cultivator which shall be simple in construction, easily guided and controlled, of light draft, and readily adjusted to work closer to or farther from the plants, as may be desired.

The invention will first be described in connection with the drawing, and then pointed out in the claims.

A are the wheels, which revolve upon the journals of the axle B. The end parts of the axle B are bent twice at an angle to raise the middle part and form a space for the plow-beams. To the end parts of the axle B are attached the rear ends of two side bars, C, the forward ends of which are connected by a cross-bar, D.

E is the tongue, the rear part of which is bolted to and between the forward ends of the hounds F, and its rear end is bolted to the cross-bar D. To the inner sides of the hounds F are bolted the forward ends of two bars, G, which meet at an angle in the rear of the axle B. The bars G rest upon the axle B, and to their rear ends, at their point of meeting, is attached the driver's seat H.

To the end parts of the cross-bar D are attached the upper ends of two hangers, I, to the lower ends of which are swiveled the forward ends of two coupling-blocks, J. To the opposite sides of the rear ends of each of the coupling-blocks J are pivoted the forward ends of two plow-beams, K, so that the rear part of each plow-beam may have a free vertical movement, while the swiveled couplings J allow each pair of beams K to have a free lateral movement. To the forward part of the beams K of each pair is attached the branched lower end of a chain, L, which passes over a pulley, M, pivoted to supports attached to the rear side of the cross-bar D. The chain L passes along the grooved upper side of an arm or segment, N, and is adjustably attached to the rear part of said segment. The segments N are attached to the forward parts of the levers O, which are pivoted near their forward ends to the outer sides of the hounds F. The rear ends of the levers O pass back into such a position that they may be readily reached and operated by the driver from his seat H. The levers O move up and down along the inner sides of the curved bars P attached to the axle B, and which have notched or perforated flanges formed along the outer sides of their forward edges to receive the locking-pins Q. The pins Q slide in guides attached to the outer sides of the levers O, and are held forward to engage with the flanges of the bars P by coiled springs R. To the rear ends of the pins Q are pivoted the forward ends of the connecting-rods S, the rear ends of which are pivoted to the angles of the small angle-levers T. The short arms of the levers T are pivoted to the levers O, and their long arms project below the handles of the said levers O, so that they can be operated by the hands that grasp the said levers O to withdraw the pins Q and allow the plow-beams to be raised and lowered.

This construction enables the plows to be raised from the ground for convenience in passing from place to place, and to be adjusted to enter the ground to any desired depth.

To one beam of each pair is attached an arm, U, having a cross-head formed upon its outer end, which slides in a half-keeper, V, attached to the other beam of each pair, to keep the said beams at the same distance apart while allowing them to work up and down freely.

W is a bolt, which passes through a short slot in the plow-beam, to which the half-keeper V is attached, and said bolt may be moved forward into a notch in the cross-head of the arm U when it is desired to lock the beams of each pair parallel with each other. X are the plow-standards, the lower parts of which are rounded off, and fit into sockets Y, attached to or formed upon the rear sides of the plow-plates Z, where they are secured in place by set-screws A', passing through the sides of the said sockets and resting against the sides of the said standards, so that by loosening the said set-screws the plows Z may be adjusted to throw the soil toward or from the plants, as may be desired.

The upper ends of the standards X fit into notches in the outer ends of the blocks B', where they are secured in place by bolts passing through them, through the said blocks B', and through the plow-beams K, so as to pivot the said standards and blocks to the said beams. Upon the inner ends of the blocks B' are formed cross-arms, which extend along the sides of the plow-beams. The forward arms of the blocks B' have notches formed in their lower edges, and the rear arms have notches formed in their upper edges to hook upon the bolts C', attached to the beams K, so that the said arms may be clamped against the said beams by the heads of the said bolts with any desired force.

With this construction the bolts C' are screwed up tight enough to resist the draft-strain upon the standards X under ordinary circumstances; but should the plows strike an obstruction the arms of the blocks B' will be forced away from the bolts C', allowing the plows to swing back and preventing breakage.

To prevent small plants from being covered or injured by the soil thrown by the plows, fender-plates D' are interposed between the said plants and the inner plows. The fenders D' are attached to the rear ends of the bars E', the forward ends of which are pivoted to the forward parts of the inner sides of the inner beams K. The fenders D' are supported at any desired elevation, to allow more or less soil to pass to the plants, as may be desired, by cams F', which are secured to the beams K by bolts, and upon which the bars E' rest. To the inner beams K are attached rests G', to receive the driver's feet, and enable him to guide the plows with his feet.

H' are two plates, which are slotted longitudinally to receive the bolts I', and their end parts are bent forward and outward, and are bolted to the rear side of the axle B, upon the opposite sides of and equally distant from its center. The bolts I' pass through the upper ends of the curved arms J', the lower ends of which pass through guide-plates K', attached to the inner beams K. To the upper parts of the arms J' is pivoted a connecting-bar, L', so that the said arms J' may always move together. The slots in the plates H allow the upper ends of the arms J' to be adjusted wider apart or closer together, according as it is desired to have the plows work closer to or farther from the plants. Several holes are formed in the connecting-bar L' to receive the pivoting-bolts, so that the said bar may be adjusted to correspond with the adjustment of the upper ends of the arms J'. This device, in connection with the foot-rests G', enables the driver to readily guide the plows with his feet, as the outward movement of either pair of beams K draws the other pair with it.

When the machine is used for cross-plowing, the fenders D' E' F' are detached, and the forked forward end of the plow-beam M' is secured to and between the inner beams K by the same bolts that secured the said fenders to the said beams. The rear end of the beam M' is slotted, and to it is pivoted the upper part of the standard N' by a bolt passing through it and through the said standard. To the lower end of the standard N' is secured a plow, Z, by a socket, Y, and a set-screw, A', in the same manner as the plows are secured to the standards X. The upper end of the standard N' is curved forward and downward, so as to enter the slot of the beam M', and through it is passed a small wooden pin, O', which rests upon the upper side of the beam M', and which is made of such a size as to sustain the draft-strain under ordinary circumstances, but will break should the plow strike an obstruction, and thus prevent the machine from being broken.

When the middle plow is used the five plows may be adjusted in an inclined line, or each one in advance of the next, by adjusting three of the other plows upon their beams. To enable this to be conveniently done, several holes are formed in the beams K to receive the fastening-bolts.

Having thus described my invention, I claim as new and desire to secure by Letters Patent—

1. The block J, swiveled upon the hanger I, and having two bearing-faces, in combination with the two plow-beams K K, and with the arm U, having a vertical notched cross-head, and the angular plate or keeper V, whereby two separate plow-beams are attached to one hanger, and allowed independent movement or vertical adjustment with respect to each other, as shown and described.

2. The combination of the swinging curved arms J' J', the connecting-bar L', the pivot-bolts I', and the slotted plates H' with the pairs of laterally-movable plow-beams having guide-plates K', and the supporting-frame, as and for the purpose set forth.

FREDRIC W. DEGEN.

Witnesses:
SAMUEL HILL,
HENRY DOSE.